United States Patent
Abe et al.

(10) Patent No.: US 8,958,224 B2
(45) Date of Patent: Feb. 17, 2015

(54) POWER CONVERTER

(75) Inventors: Yasushi Abe, Hino (JP); Makoto Hashii, Tokyo (JP); Kiyoshi Takahashi, Sagamihara (JP)

(73) Assignee: Fuji Electric Co., Ltd. (JP)

( * ) Notice: Subject to any disclaimer, the term of this patent is extended or adjusted under 35 U.S.C. 154(b) by 534 days.

(21) Appl. No.: 13/413,222

(22) Filed: Mar. 6, 2012

(65) Prior Publication Data

US 2012/0228945 A1 Sep. 13, 2012

(30) Foreign Application Priority Data

Mar. 7, 2011 (JP) .................................. 2011-049082

(51) Int. Cl.
- H02M 7/5387 (2007.01)
- H02M 7/487 (2007.01)
- H02M 7/00 (2006.01)

(52) U.S. Cl.
CPC .............. H02M 7/487 (2013.01); H02M 7/003 (2013.01)
USPC .......................................... 363/132; 307/151

(58) Field of Classification Search
CPC .................................................... H02M 7/003
USPC .......................................... 307/151; 363/132
See application file for complete search history.

(56) References Cited

U.S. PATENT DOCUMENTS

| | | | | |
|---|---|---|---|---|
| 7,126,409 B2* | 10/2006 | Nielsen | ......................... | 327/391 |
| 7,639,515 B2* | 12/2009 | Ponnaluri et al. | ............... | 363/17 |
| 8,130,524 B2* | 3/2012 | Lee et al. | ....................... | 363/132 |
| 8,598,749 B2* | 12/2013 | Lacarnoy | ..................... | 307/140 |
| 8,730,691 B2* | 5/2014 | Paatero | ..................... | 363/56.01 |
| 2004/0155526 A1* | 8/2004 | Naden et al. | .................... | 307/43 |
| 2004/0165408 A1* | 8/2004 | West et al. | .................... | 363/131 |

FOREIGN PATENT DOCUMENTS

JP 2002-247862 A 8/2002

* cited by examiner

*Primary Examiner* — Daniel Cavallari
(74) *Attorney, Agent, or Firm* — Rossi, Kimms & McDowell LLP

(57) ABSTRACT

A power converter can be configured of a first series circuit, formed from a first semiconductor switching element and a second semiconductor switching element connected in series to either end of a direct current voltage supply series circuit formed from a first direct current voltage supply and a second direct current voltage supply connected in series, and a second series circuit, formed from a third semiconductor switching element and a fourth semiconductor switching element connected in series between a connection point of the first direct current voltage supply and the second direct current voltage supply and a connection point of the first semiconductor switching element and the second semiconductor switching element. The first semiconductor switching element and the third semiconductor switching element can be configured of a first semiconductor device, and the second semiconductor switching element and the fourth semiconductor switching element can be configured of a second semiconductor device.

14 Claims, 5 Drawing Sheets

POWER CONVERTER

BACKGROUND OF THE INVENTION

1. Technical Field

Embodiments of the present invention relate to power converters, and, in particular, three-level power converters.

2. Related Art

A three-level power converter is employed in a power converter that converts direct current power to alternating current power or alternating current power to direct current power. A three-level power converter can reduce alternating current voltage waveform distortion, enabling a reduction of unwanted sound and noise.

FIG. 9 shows a circuit of a three-level power converter disclosed in Japanese Patent Application No. 2002-247862. In FIG. 9, reference numeral 1 is a first direct current power supply, 2 is a second direct current power supply, M10 and M20 are semiconductor devices, and Q1 to Q4 are first to fourth semiconductor switching elements.

The first direct current power supply 1 and the second direct current power supply 2 are connected in series, configuring a direct current voltage supply series circuit. One end of the direct current voltage supply series circuit is a first terminal P, while the other end is a second terminal N. A connection point of the first direct current power supply 1 and the second direct current power supply 2 is a third terminal C. The voltages of the first direct current power supply 1 and the second direct current power supply 2 are normally the same voltage. When taking each voltage to be $E/2(V)$, the voltage across the direct current voltage supply series circuit (the voltage between the first terminal P and the second terminal N) is $E(V)$.

The semiconductor device M10 is configured of a series circuit of the semiconductor switching elements Q1 and Q2 (a first series circuit). The two ends of the series circuit of the semiconductor switching elements Q1 and Q2 are connected each to the first terminal P and the second terminal N. Also, a connection point of the semiconductor switching elements Q1 and Q2 is connected to a fourth terminal AC.

Meanwhile, the semiconductor device M20 is configured of a series circuit of the semiconductor switching elements Q3 and Q4 (a second series circuit). The two ends of the series circuit of the semiconductor switching elements Q3 and Q4 are connected each to the third terminal C and the connection point of the semiconductor switching elements Q1 and Q2.

The first to fourth semiconductor switching elements Q1 to Q4 are, for example, insulated gate bipolar transistors (IGBTs) with self-commutation capability, or the like, and a diode is connected in anti-parallel to either end thereof.

In the circuit of FIG. 9, when the IGBT of the semiconductor switching element Q1 is turned on and the IGBTs of the semiconductor switching elements Q2 to Q4 are turned off, the voltage $E(V)$ is output to the fourth terminal AC. When the IGBTs of the semiconductor switching elements Q1 and Q2 are turned off and either of the IGBTs of the semiconductor switching elements Q3 and Q4 is turned on, the voltage $E/2$ (V) is output to the fourth terminal AC. When the IGBT of the semiconductor switching element Q2 is turned on and the IGBTs of the semiconductor switching elements Q1, Q3, and Q4 are turned off, a voltage of $0(V)$ is output to the fourth terminal AC.

Because of this, the power converter shown in FIG. 9 can generate alternating current voltage formed from three levels of potential, $0(V)$, $E/2(V)$, and $E(V)$.

In the power converter using the heretofore known technology described above, the first series circuit wherein the semiconductor switching elements Q1 and Q2 are connected in series is configured of the semiconductor device M10. Also, the second series circuit wherein the semiconductor switching elements Q3 and Q4 are connected in series is configured of the semiconductor device M20. Then, the switching loss occurring in the semiconductor switching elements Q1 and Q2 is roughly twice the switching loss occurring in the semiconductor switching elements Q3 and Q4. Because of this, in general, the size of the loss occurring in the semiconductor device M10 is approximately 1.5 times larger in comparison with the size of the loss occurring in the semiconductor device M20.

Consequently, two kinds of cooling fins with differing cooling capabilities are needed in order to optimally cool the semiconductor device M10 and the semiconductor device M20. As a result of this, twice the number of man-hours are needed for the design, fabrication, cooling capability evaluation, and the like, of the cooling fins. Meanwhile, when cooling the semiconductor devices M10 and M20 with cooling fins having the same cooling capability, the cooling capability of the cooling fins is fixed based on the loss characteristics of the semiconductor device M10, in which the greater loss occurs. Because of this, when considering the cooling of the semiconductor device M20, the cooling capability of the cooling fin is too high. In this case, there is a hindrance to a reduction in size and a reduction in cost of the power converter. Thus, there is a need in the art for an improved power converters.

SUMMARY OF THE INVENTION

Embodiments of the present invention address these and other needs. Embodiments of the invention provide a power converter with which it is possible to equalize the loss occurring in semiconductor devices.

A power converter of one aspect of the invention includes a direct current voltage supply series circuit formed by a first direct current voltage supply and a second direct current voltage supply connected in series, a first terminal connected to a positive side terminal of the direct current voltage supply series circuit, a second terminal connected to a negative side terminal, a third terminal connected to a connection point of the first direct current voltage supply and the second direct current voltage supply, a first series circuit formed by a first semiconductor switching element and the second semiconductor switching element, each with a diode connected thereto in anti-parallel, connected in series, a fourth terminal connected to a connection point of the first semiconductor switching element and the second semiconductor switching element of the first series circuit, and a second series circuit formed by a third semiconductor switching element and a fourth semiconductor switching element, each with a diode connected thereto in anti-parallel, connected in anti-series, the two ends of the first series circuit being connected each to the first terminal and the second terminal, and the two ends of the second series circuit being connected each to the third terminal and the fourth terminal, wherein the first semiconductor switching element and the third semiconductor switching element are configured of a first semiconductor device, and the second semiconductor switching element and the fourth semiconductor switching element are configured of a second semiconductor device.

Then, the power converter according to the aspect of the invention is such that terminals of the first semiconductor switching element and the terminals of the third semiconductor switching element are electrically isolated inside the first semiconductor device, and the terminals of the second semiconductor switching element and the terminals of the fourth semiconductor switching element are electrically isolated inside the second semiconductor device.

Alternatively, the power converter according to the aspect of the invention is such that the first semiconductor switching element and the third semiconductor switching element are connected in series inside the first semiconductor device, and the terminals of the second semiconductor switching element and the terminals of the fourth semiconductor switching element are electrically isolated inside the second semiconductor device.

Alternatively, the power converter according to the aspect of the invention is such that the terminals of the first semiconductor switching element and the terminals of the third semiconductor switching element are electrically isolated inside the first semiconductor device, and the second semiconductor switching element and the fourth semiconductor switching element are connected in series inside the second semiconductor device.

Then, the power converter according to the aspect of the invention is such that when the first semiconductor switching element and the third semiconductor switching element are connected in series to the first direct current voltage supply, and the second semiconductor switching element and the fourth semiconductor switching element are connected in series to the second direct current voltage supply, the first semiconductor switching element and the second semiconductor switching element have a forward breakdown voltage higher than the voltage across the direct current voltage supply series circuit, the forward breakdown voltage of the third semiconductor switching element is higher than the voltage of the first direct current voltage supply and lower than the forward breakdown voltage of the first semiconductor switching element, and the forward breakdown voltage of the fourth semiconductor switching element is higher than the voltage of the second direct current voltage supply and lower than the forward breakdown voltage of the second semiconductor switching element.

Alternatively, the power converter according to the aspect of the invention is such that when the first semiconductor switching element and the fourth semiconductor switching element are connected in series to the first direct current voltage supply, and the second semiconductor switching element and the third semiconductor switching element are connected in series to the second direct current voltage supply, the first semiconductor switching element and the second semiconductor switching element have a forward breakdown voltage higher than the voltage across the direct current voltage supply series circuit, the forward breakdown voltage of the third semiconductor switching element is higher than the voltage of the second direct current voltage supply and lower than the forward breakdown voltage of the first semiconductor switching element, and the forward breakdown voltage of the fourth semiconductor switching element is higher than the voltage of the first direct current voltage supply and lower than the forward breakdown voltage of the second semiconductor switching element.

According to embodiments of the invention, it is possible to provide a power converter with which it is possible to equalize the loss occurring in semiconductor devices.

DETAILED DESCRIPTION

Figure 1:
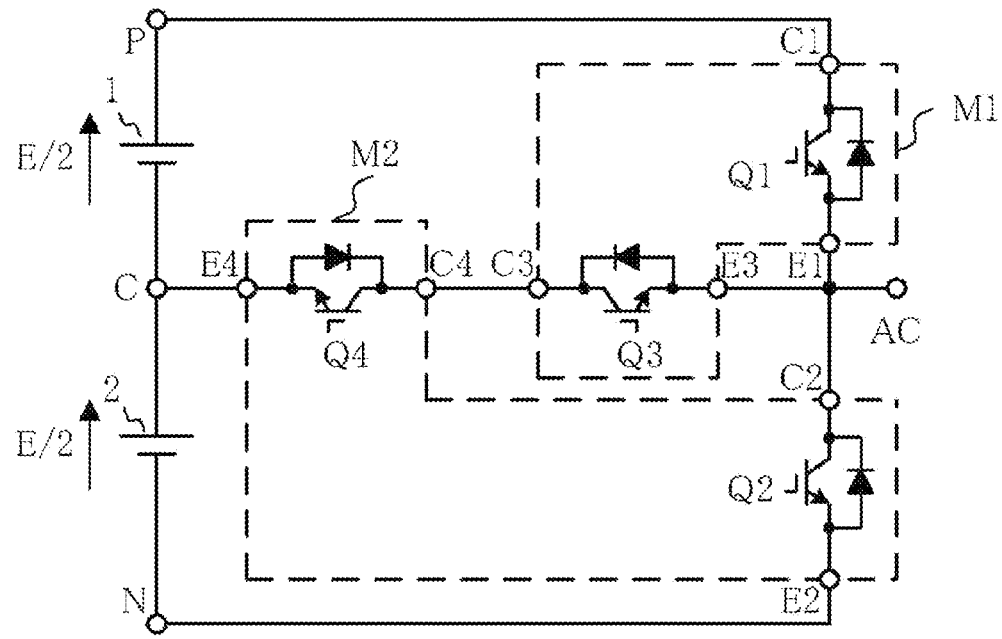
FIG. 1 is a diagram for illustrating a first embodiment of a power converter according to embodiments of the invention.

Hereafter, a description will be given, while referring to FIGS. 1 to 8, of embodiments of the invention. In FIGS. 1 to 8, a first direct current voltage supply 1, a second direct current voltage supply 2, and semiconductor switching elements Q1 to Q4 are the same as components of a power converter shown in FIG. 9. Consequently, the same reference numerals and characters are given to each component, and a description thereof is omitted. Also, the points that a first series circuit configuring a power converter is formed by a circuit wherein the semiconductor switching elements Q1 and Q2 are connected in series, and that a second series circuit is formed by a circuit wherein the semiconductor switching elements Q3 and Q4 are connected in anti-series, are also the same. Meanwhile, in FIGS. 1 to 8, a semiconductor device M1 is configured of the semiconductor switching elements Q1 and Q3, while a semiconductor device M2 is configured of the semiconductor switching elements Q2 and Q4. This point differs from the configuration of semiconductor devices M10 and M20 of FIG. 9.

FIG. 1 is a diagram for illustrating a first embodiment of the power converter according to the invention.

In FIG. 1, the semiconductor device M1 has four terminals, terminals C1, E1, C3, and E3, for connecting to an external circuit. The terminal C1 is connected to the collector terminal of the semiconductor switching element Q1, while the terminal E1 is connected to the emitter terminal. Also, the terminal C3 is connected to the collector terminal of the semiconductor switching element Q3, while the terminal E3 is connected to the emitter terminal. Then, the collector terminal and the emitter terminal of the semiconductor switching element Q1 and the collector terminal and the emitter terminal of the semiconductor switching element Q3 are each isolated.

Meanwhile, the semiconductor device M2 has four terminals, terminals C2, E2, C4, and E4, for connecting to an external circuit. The terminal C2 is connected to the collector terminal of the semiconductor switching element Q2, while the terminal E2 is connected to the emitter terminal. Also, the terminal C4 is connected to the collector terminal of the semiconductor switching element Q4, while the terminal E4 is connected to the emitter terminal. Then, the collector terminal and the emitter terminal of the semiconductor switching element Q2 and the collector terminal and the emitter terminal of the semiconductor switching element Q4 are each isolated.

Next, the first series circuit is a circuit wherein the semiconductor switching element Q1 of the semiconductor device M1 and the semiconductor switching element Q2 of the semiconductor device M2 are connected in series. In order to configure the first series circuit, the terminal E1 of the semiconductor device M1 and the terminal C2 of the semiconductor device M2 are connected. This connection point is connected to a fourth terminal AC. Also, the terminal C1 of the semiconductor device M1 is connected to a first terminal P. Furthermore, the terminal E2 of the semiconductor device M2 is connected to a second terminal N.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal C3 of the semiconductor device M1 and the terminal C4 of the semiconductor device M2 are connected. By so doing, the semiconductor switching element Q3 and the semiconductor switching element Q4 are connected in anti-series. Also, the terminal E3 of the semiconductor device M1 is connected to the connection point of the terminal E1 of the semiconductor device M1 and the terminal C2 of the semiconductor device M2. Furthermore, the terminal E4 of the semiconductor device M2 is connected to a third terminal C.

By combining the semiconductor devices M1 and M2 in this way, it is possible to configure a three-level power converter.

Figure 2:
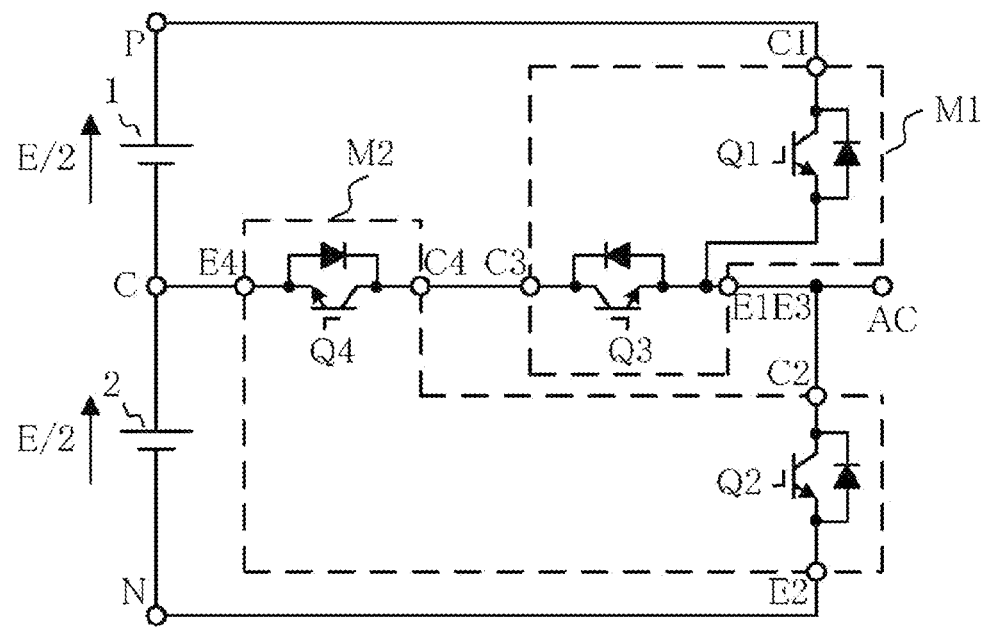
FIG. 2 is a diagram for illustrating a second embodiment of the power converter according to embodiments of the invention.

FIG. 2 is a diagram for illustrating a second embodiment of the power converter according to the invention.

In FIG. 2, the semiconductor device M1 has three terminals, terminals C1, E1E3, and C3, for connecting to an external circuit. The terminal C1 is connected to the collector terminal of the semiconductor switching element Q1, while the terminal C3 is connected to the collector terminal of the semiconductor switching element Q3. Then, the emitter terminal of the semiconductor switching element Q1 and the emitter terminal of the semiconductor switching element Q3 are connected inside the semiconductor device M1. This connection point is connected to the terminal E1E3 for connection to an external circuit.

Meanwhile, the semiconductor device M2, in the same way as the semiconductor device M2 of FIG. 1, has four terminals, and the configuration thereof is also the same.

Next, the first series circuit is a circuit wherein the semiconductor switching element Q1 of the semiconductor device M1 and the semiconductor switching element Q2 of the semiconductor device M2 are connected in series. In order to configure the first series circuit, the terminal E1E3 of the semiconductor device M1 and the terminal C2 of the semiconductor device M2 are connected. This connection point is connected to the fourth terminal AC. Also, the terminal C1 of the semiconductor device M1 is connected to the first terminal P. Furthermore, the terminal E2 of the semiconductor device M2 is connected to the second terminal N.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal C3 of the semiconductor device M1 and the terminal C4 of the semiconductor device M2 are connected. By so doing, the semiconductor switching element Q3 and the semiconductor switching element Q4 are connected in anti-series. Also, the terminal E1E3 of the semiconductor device M1 is connected to the terminal C2 of the semiconductor device M2. Furthermore, the terminal E4 of the semiconductor device M2 is connected to the third terminal C.

By combining the semiconductor devices M1 and M2 in this way too, it is possible to configure a three-level power converter.

Figure 3:
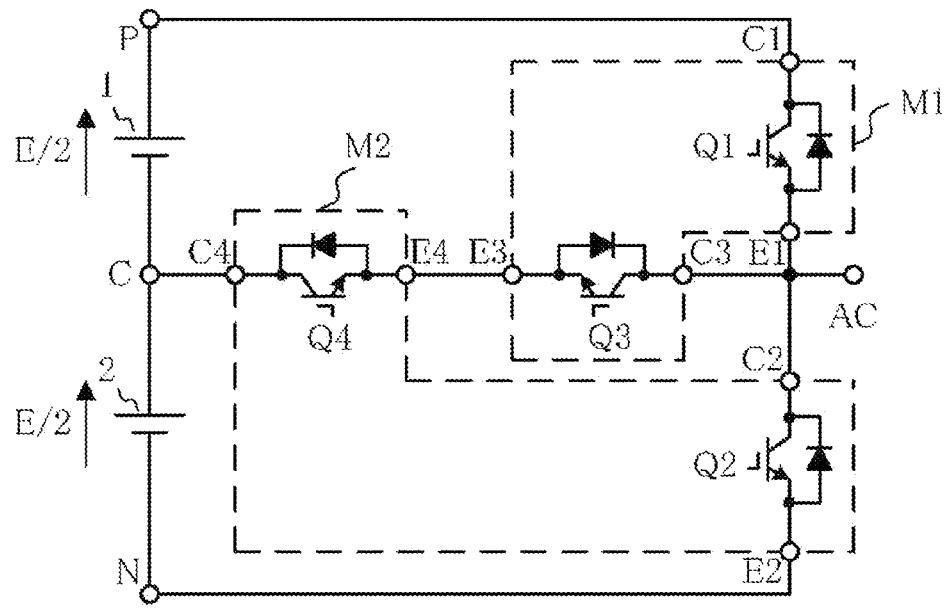
FIG. 3 is a diagram for illustrating a third embodiment of the power converter according to embodiments of the invention.

FIG. 3 is a diagram for illustrating a third embodiment of the power converter according to the invention.

In FIG. 3, each of the semiconductor devices M1 and M2, in the same way as the semiconductor devices M1 and M2 shown in FIG. 1, has four terminals, and the configuration thereof is also the same.

Also, the first series circuit is also the same as the first series circuit shown in FIG. 1.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal E3 of the semiconductor device M1 and the terminal E4 of the semiconductor device M2 are connected. By so doing, the semiconductor switching element Q3 and the semiconductor switching element Q4 are connected in anti-series. Also, the terminal C3 of the semiconductor device M1 is connected to the connection point of the terminal E1 of the semiconductor device M1 and the terminal C2 of the semiconductor device M2. Furthermore, the terminal C4 of the semiconductor device M2 is connected to the third terminal C.

By combining the semiconductor devices M1 and M2 in this way too, it is possible to configure a three-level power converter.

Figure 4:
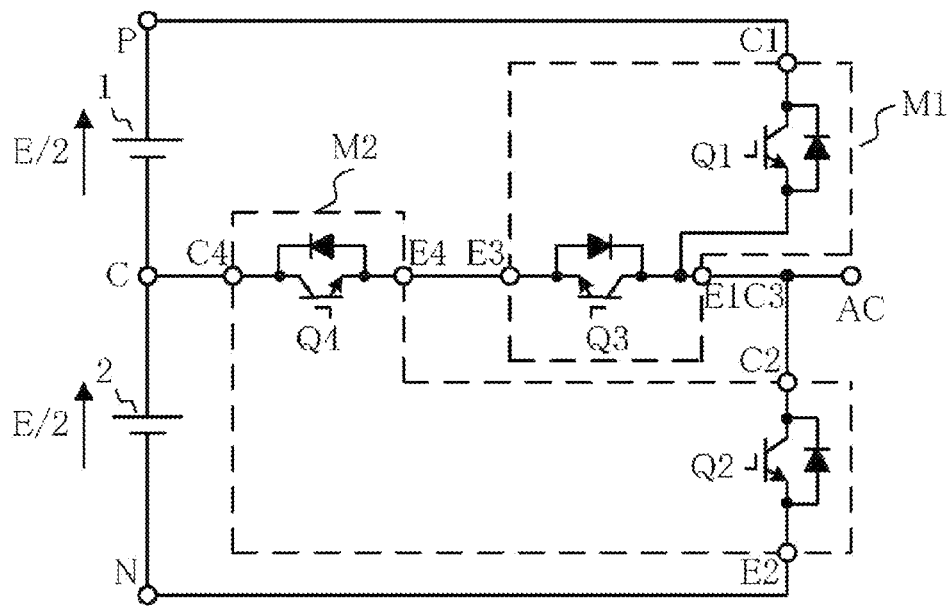
FIG. 4 is a diagram for illustrating a fourth embodiment of the power converter according to embodiments of the invention.

FIG. 4 is a diagram for illustrating a fourth embodiment of the power converter according to the invention.

In FIG. 4, the semiconductor device M1 has three terminals, terminals C1, E1C3, and E3, for connecting to an external circuit. The terminal C1 is connected to the collector terminal of the semiconductor switching element Q1, while the terminal E3 is connected to the emitter terminal of the semiconductor switching element Q3. Then, the emitter terminal of the semiconductor switching element Q1 and the collector terminal of the semiconductor switching element Q3 are connected inside the semiconductor device M1. This connection point is connected to the terminal E1C3 for connection to an external circuit.

Meanwhile, the semiconductor device M2, in the same way as the semiconductor device M2 of FIG. 1, has four terminals, and the configuration thereof is also the same.

Next, the first series circuit is a circuit wherein the semiconductor switching element Q1 of the semiconductor device M1 and the semiconductor switching element Q2 of the semiconductor device M2 are connected in series. In order to configure the first series circuit, the terminal E1C3 of the semiconductor device M1 and the terminal C2 of the semiconductor device M2 are connected. This connection point is connected to the fourth terminal AC. Also, the terminal C1 of the semiconductor device M1 is connected to the first terminal P. Furthermore, the terminal E2 of the semiconductor device M2 is connected to the second terminal N.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal E3 of the semiconductor device M1 and the terminal E4 of the semiconductor device M2 are connected. By so doing, the semiconductor switching element Q3 and the semiconductor switching element Q4 are connected in anti-series. Also, the terminal E1C3 of the semiconductor device M1 is connected to the terminal C2 of the semiconductor device M2. Furthermore, the terminal C4 of the semiconductor device M2 is connected to the third terminal C.

By combining the semiconductor devices M1 and M2 in this way too, it is possible to configure a three-level power converter.

Figure 5:
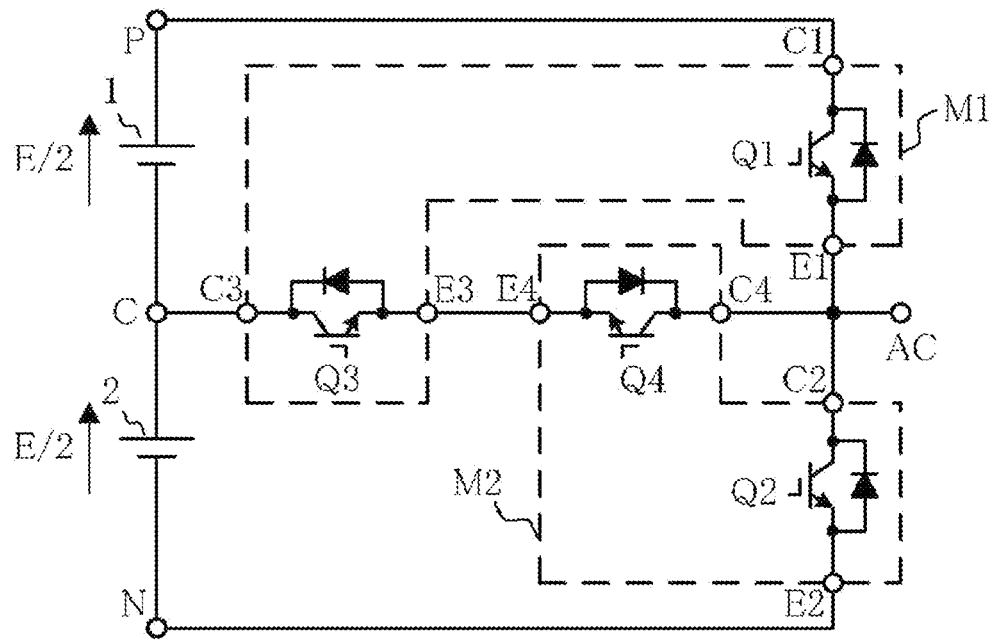
FIG. 5 is a diagram for illustrating a fifth embodiment of the power converter according to embodiments of the invention.

FIG. 5 is a diagram for illustrating a fifth embodiment of the power converter according to the invention.

In FIG. 5, each of the semiconductor devices M1 and M2, in the same way as the semiconductor devices M1 and M2 shown in FIG. 1, has four terminals, and the configuration thereof is also the same.

Also, the first series circuit is also the same as the first series circuit shown in FIG. 1.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal E3 of the semiconductor device M1 and the terminal E4 of the semiconductor device M2 are connected. By so doing, the semiconductor switching element Q3 and the semiconductor switching element Q4 are connected in anti-series. Also, the terminal C3 of the semiconductor device M1 is connected to the third terminal C. Furthermore, the terminal C4 of the semiconductor device M2 is connected to the connection point of the terminal E1 of the semiconductor device M1 and the terminal C2 of the semiconductor device M2.

By combining the semiconductor devices M1 and M2 in this way too, it is possible to configure a three-level power converter.

Figure 6:
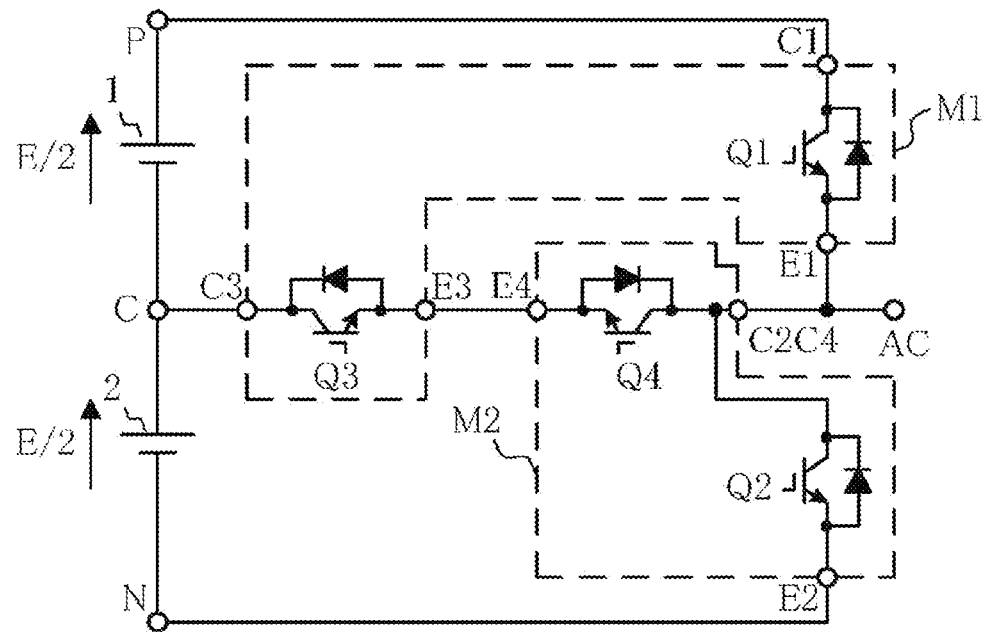
FIG. 6 is a diagram for illustrating a sixth embodiment of the power converter according to embodiments of the invention.

FIG. 6 is a diagram for illustrating a sixth embodiment of the power converter according to the invention.

In FIG. 6, the semiconductor device M1, in the same way as the semiconductor device M1 of FIG. 1, has four terminals, and the configuration thereof is also the same.

Meanwhile, the semiconductor device M2 has three terminals, terminals C2C4, E2, and E4, for connecting to an external circuit. The terminal E2 is connected to the emitter terminal of the semiconductor switching element Q2, while the terminal E4 is connected to the emitter terminal of the semiconductor switching element Q4. Then, the collector terminal of the semiconductor switching element Q2 and the collector terminal of the semiconductor switching element Q4 are connected inside the semiconductor device M2. This connection point is connected to the terminal C2C4 for connection to an external circuit.

Next, the first series circuit is a circuit wherein the semiconductor switching element Q1 of the semiconductor device M1 and the semiconductor switching element Q2 of the semiconductor device M2 are connected in series. In order to configure the first series circuit, the terminal E1 of the semiconductor device M1 and the terminal C2C4 of the semiconductor device M2 are connected. This connection point is connected to the fourth terminal AC. Also, the terminal C1 of the semiconductor device M1 is connected to the first terminal P. Furthermore, the terminal E2 of the semiconductor device M2 is connected to the second terminal N.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal E3 of the semiconductor device M1 and the terminal E4 of the semiconductor device M2 are connected. By so doing, the semiconductor switching element Q3 and the semiconductor switching element Q4 are connected in anti-series. Also, the terminal C3 of the semiconductor device M1 is connected to the third terminal C. Furthermore, the terminal C2C4 of the semiconductor device M2 is connected to the terminal E1 of the semiconductor device M1.

By combining the semiconductor devices M1 and M2 in this way too, it is possible to configure a three-level power converter.

Figure 7:
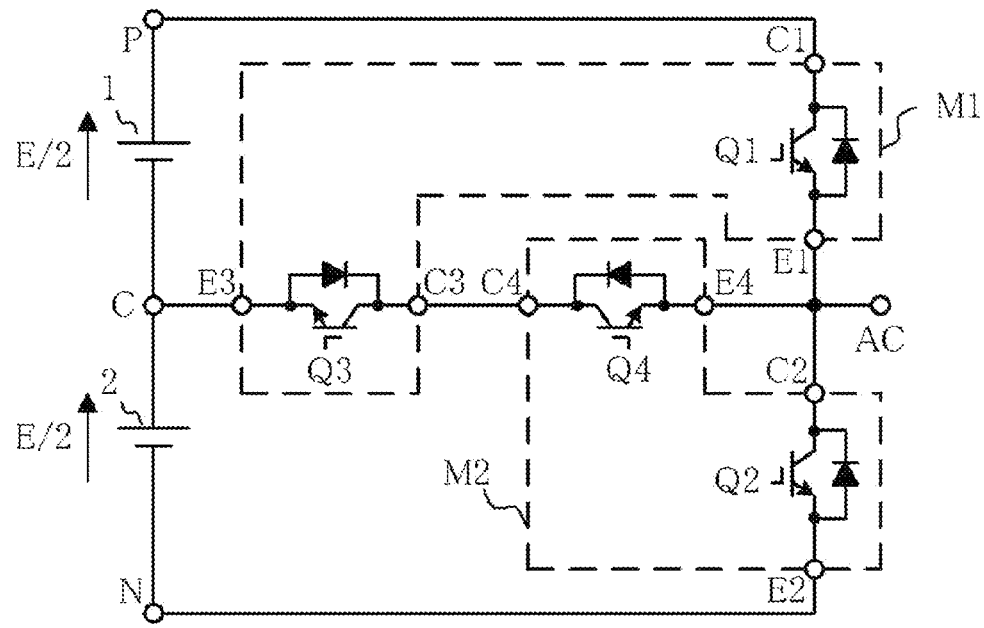
FIG. 7 is a diagram for illustrating a seventh embodiment of the power converter according to embodiments of the invention.

FIG. 7 is a diagram for illustrating a seventh embodiment of the power converter according to the invention.

In FIG. 7, each of the semiconductor devices M1 and M2, in the same way as the semiconductor devices M1 and M2 shown in FIG. 1, has four terminals, and the configuration thereof is also the same.

Also, the first series circuit is also the same as the first series circuit shown in FIG. 1.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal C3 of the semiconductor device M1 and the terminal C4 of the semiconductor device M2 are connected. By so doing, the semiconductor switching element Q3 and the semiconductor switching element Q4 are connected in anti-series. Also, the terminal E3 of the semiconductor device M1 is connected to the third terminal C. Furthermore, the terminal E4 of the semiconductor device M2 is connected to the connection point of the terminal E1 of the semiconductor device M1 and the terminal C2 of the semiconductor device M2.

By combining the semiconductor devices M1 and M2 in this way too, it is possible to configure a three-level power converter.

Figure 8:
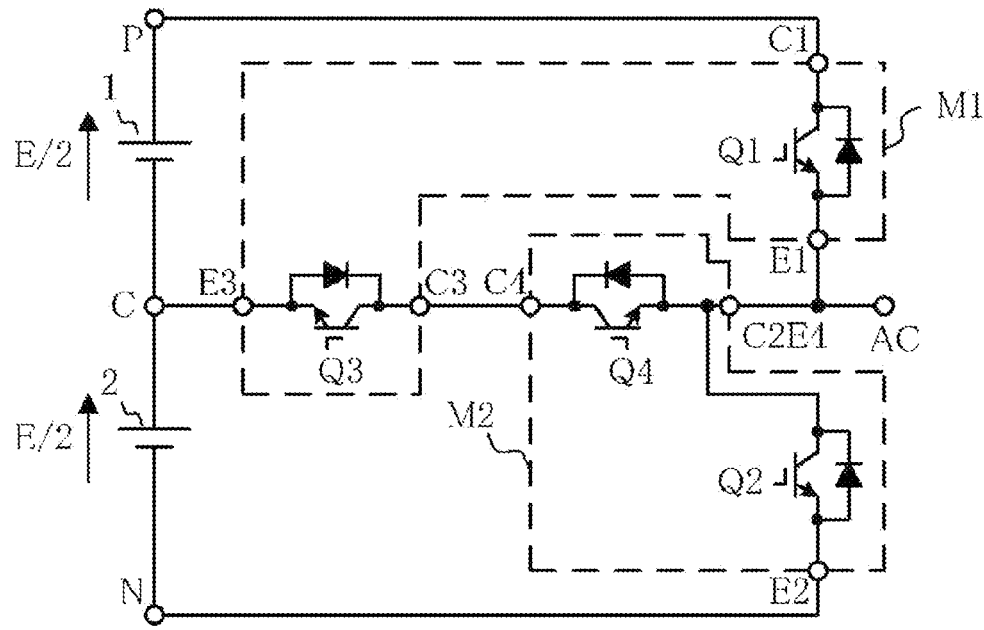
FIG. 8 is a diagram for illustrating an eighth embodiment of the power converter according to embodiments of the invention.
Figure 9:
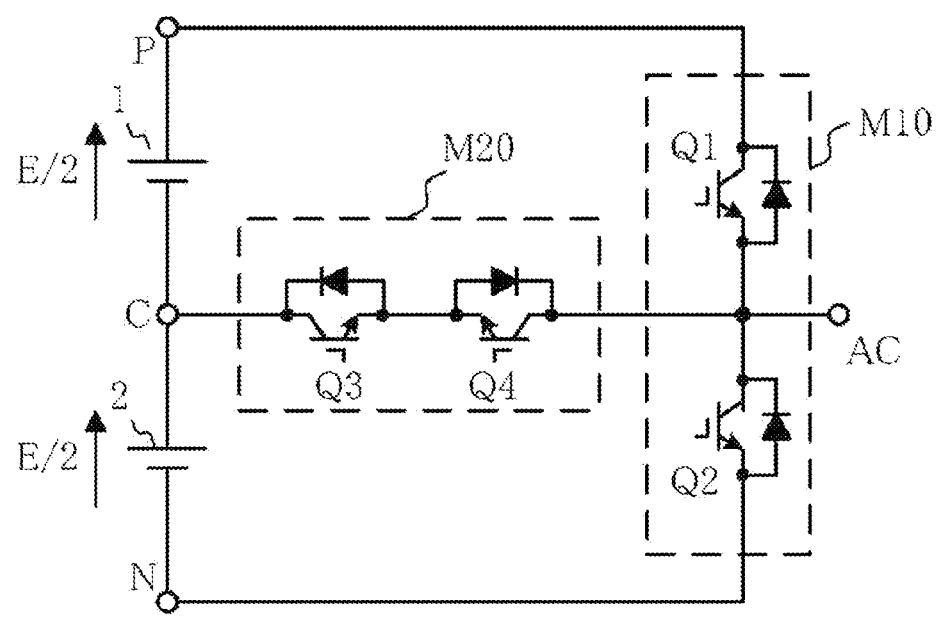
FIG. 9 is a diagram for illustrating a heretofore known power converter.

FIG. 8 is a diagram for illustrating an eighth embodiment of the power converter according to the invention.

In FIG. 8, the semiconductor device M1, in the same way as the semiconductor device M1 of FIG. 1, has four terminals, and the configuration thereof is also the same.

Meanwhile, the semiconductor device M2 has three terminals, terminals C2E4, E2, and C4, for connecting to an external circuit. The terminal E2 is connected to the emitter terminal of the semiconductor switching element Q2, while the terminal C4 is connected to the collector terminal of the semiconductor switching element Q4. Then, the collector terminal of the semiconductor switching element Q2 and the emitter terminal of the semiconductor switching element Q4 are connected inside the semiconductor device M2. This connection point is connected to the terminal C2E4 for connection to an external circuit.

Next, the first series circuit is a circuit wherein the semiconductor switching element Q1 of the semiconductor device M1 and the semiconductor switching element Q2 of the semiconductor device M2 are connected in series. In order to configure the first series circuit, the terminal E1 of the semiconductor device M1 and the terminal C2E4 of the semiconductor device M2 are connected. This connection point is connected to the fourth terminal AC. Also, the terminal C1 of the semiconductor device M1 is connected to the first terminal P. Furthermore, the terminal E2 of the semiconductor device M2 is connected to the second terminal N.

The second series circuit is a circuit wherein the semiconductor switching element Q3 of the semiconductor device M1 and the semiconductor switching element Q4 of the semiconductor device M2 are connected in anti-series. In order to configure the second series circuit, the terminal C3 of the semiconductor device M1 and the terminal C4 of the semiconductor device M2 are connected. By so doing, the semiconductor switching element Q3 and the semiconductor switching element Q4 are connected in anti-series. Also, the terminal E3 of the semiconductor device M1 is connected to the third terminal C. Furthermore, the terminal C2E4 of the semiconductor device M2 is connected to the terminal E1 of the semiconductor device M1.

By combining the semiconductor devices M1 and M2 in this way too, it is possible to configure a three-level power converter.

In the power converter shown in FIGS. 1 to 8, the losses occurring in the semiconductor switching elements Q1 and Q2 are the same. Also, the losses occurring in the semiconductor switching elements Q3 and Q4 are the same. Consequently, the losses occurring in the semiconductor devices M1 and M2 are the same. That is, by configuring the power converter using the semiconductor devices M1 and M2 shown in FIGS. 1 to 8, it is possible to equalize the losses occurring in the semiconductor devices M1 and M2.

Also, a voltage E(V), wherein a voltage E/2(V) of the first direct current voltage supply 1 and a voltage E/2(V) of the second direct current voltage supply 2 are added, is applied to the semiconductor switching elements Q1 and Q2, as shown in FIGS. 1 to 8. Also, the voltage E/2(V) of the first direct current voltage supply 1 or the voltage E/2(V) of the second direct current voltage supply 2 is applied to the semiconductor switching elements Q3 and Q4.

Consequently, in a more preferable embodiment, the semiconductor switching elements having a forward breakdown voltage higher than E(V) are used for the semiconductor switching elements Q1 and Q2.

Then, a semiconductor switching element having a forward breakdown voltage higher than the voltage E/2(V) of the second direct current voltage supply 2, and having a forward breakdown voltage lower than that of the semiconductor switching elements Q1 and Q2, is used for the semiconductor switching element Q3 shown in FIGS. 1, 2, 7, and 8. Meanwhile, a semiconductor switching element having a forward breakdown voltage higher than the voltage E/2(V) of the first direct current voltage supply 1, and having a forward breakdown voltage lower than that of the semiconductor switching elements Q1 and Q2, is used for the semiconductor switching element Q4.

Also, a semiconductor switching element having a forward breakdown voltage higher than the voltage E/2(V) of the first direct current voltage supply 1, and having a forward breakdown voltage lower than that of the semiconductor switching elements Q1 and Q2, is used for the semiconductor switching element Q3 shown in FIGS. 3, 4, 5, and 6. Meanwhile, a semiconductor switching element having a forward breakdown voltage higher than the voltage E/2(V) of the second direct current voltage supply 2, and having a forward breakdown voltage lower than that of the semiconductor switching elements Q1 and Q2, is used for the semiconductor switching element Q4.

In general, a semiconductor switching element with a low forward breakdown voltage is such that loss occurring at a time of a switching operation is small in comparison with a semiconductor switching element with a high forward breakdown voltage. Consequently, it is possible to reduce the loss in the semiconductor devices M1 and M2 in comparison with when using the semiconductor switching elements with the same forward breakdown voltage for the semiconductor switching elements Q1 to Q4.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2011-049082, filed on Mar. 7, 2011. The disclosure of the priority application, in its entirety, including the drawings, claims, and the specification thereof, is incorporated herein by reference.

What is claimed is:
1. A power converter, comprising:
 a direct current voltage supply series circuit formed by a first direct current voltage supply and a second direct current voltage supply connected in series;
 a first terminal connected to a positive side terminal of the direct current voltage supply series circuit;
 a second terminal connected to a negative side terminal of the direct current voltage supply series circuit;
 a third terminal connected to a connection point of the first direct current voltage supply and the second direct current voltage supply;
 a first series circuit formed by a first semiconductor switching element and a second semiconductor switching element, each with a diode connected thereto in anti-parallel, connected in series;
 a fourth terminal connected to a connection point of the first semiconductor switching element and the second semiconductor switching element of the first series circuit; and
 a second series circuit formed by a third semiconductor switching element and a fourth semiconductor switching element, each with a diode connected thereto in anti-parallel, connected in anti-series,
 the two ends of the first series circuit being connected each to the first terminal and the second terminal, and
 the two ends of the second series circuit being connected each to the third terminal and the fourth terminal, wherein
 the first semiconductor switching element and the third semiconductor switching element are configured of a first semiconductor device, and
 the second semiconductor switching element and the fourth semiconductor switching element are configured of a second semiconductor device.

2. The power converter according to claim 1, wherein
 the terminals of the first semiconductor switching element and the terminals of the third semiconductor switching element are electrically isolated inside the first semiconductor device, and
 the terminals of the second semiconductor switching element and the terminals of the fourth semiconductor switching element are electrically isolated inside the second semiconductor device.

3. The power converter according to claim 1, wherein
 the first semiconductor switching element and the third semiconductor switching element are connected in series inside the first semiconductor device, and
 the terminals of the second semiconductor switching element and the terminals of the fourth semiconductor switching element are electrically isolated inside the second semiconductor device.

4. The power converter according to claim 1, wherein the first semiconductor switching element and the third semiconductor switching element are connected in anti-series inside the first semiconductor device, and
the terminals of the second semiconductor switching element and the terminals of the fourth semiconductor switching element are electrically isolated inside the second semiconductor device.

5. The power converter according to claim 1, wherein the terminals of the first semiconductor switching element and the terminals of the third semiconductor switching element are electrically isolated inside the first semiconductor device, and
the second semiconductor switching element and the fourth semiconductor switching element are connected in series inside the first semiconductor device.

6. The power converter according to claim 1, wherein the terminals of the first semiconductor switching element and the terminals of the third semiconductor switching element are electrically isolated inside the first semiconductor device, and
the second semiconductor switching element and the fourth semiconductor switching element are connected in anti-series inside the first semiconductor device.

7. The power converter according to claim 1, wherein the first semiconductor switching element and the third semiconductor switching element are connected in series to the first direct current voltage supply,
the second semiconductor switching element and the fourth semiconductor switching element are connected in series to the second direct current voltage supply,
the first semiconductor switching element and the second semiconductor switching element have a forward breakdown voltage higher than the voltage across the direct current voltage supply series circuit,
the forward breakdown voltage of the third semiconductor switching element is higher than the voltage of the first direct current voltage supply and lower than the forward breakdown voltage of the first semiconductor switching element, and
the forward breakdown voltage of the fourth semiconductor switching element is higher than the voltage of the second direct current voltage supply and lower than the forward breakdown voltage of the second semiconductor switching element.

8. The power converter according to claim 1, wherein the first semiconductor switching element and the fourth semiconductor switching element are connected in series to the first direct current voltage supply,
the second semiconductor switching element and third semiconductor switching element are connected in series to the second direct current voltage supply,
the first semiconductor switching element and the second semiconductor switching element have a forward breakdown voltage higher than the voltage across the direct current voltage supply series circuit,
the forward breakdown voltage of the third semiconductor switching element is higher than the voltage of the second direct current voltage supply and lower than the forward breakdown voltage of the first semiconductor switching element, and
the forward breakdown voltage of the fourth semiconductor switching element is higher than the voltage of the first direct current voltage supply and lower than the forward breakdown voltage of the second semiconductor switching element.

9. The power converter according to claim 1, wherein the terminals of the first semiconductor switching element and the terminals of the third semiconductor switching element are electrically isolated inside the first semiconductor device,
the terminals of the second semiconductor switching element and the terminals of the fourth semiconductor switching element are electrically isolated inside the second semiconductor device,
the second semiconductor switching element and the fourth semiconductor switching element are connected in series to the second direct current voltage supply,
the first semiconductor switching element and the second semiconductor switching element have a forward breakdown voltage higher than the voltage across the direct current voltage supply series circuit,
the forward breakdown voltage of the third semiconductor switching element is higher than the voltage of the first direct current voltage supply and lower than the forward breakdown voltage of the first semiconductor switching element, and
the forward breakdown voltage of the fourth semiconductor switching element is higher than the voltage of the second direct current voltage supply and lower than the forward breakdown voltage of the second semiconductor switching element.

10. The power converter according to claim 1, wherein the first semiconductor switching element and the third semiconductor switching element are connected in series inside the first semiconductor device,
the terminals of the second semiconductor switching element and the terminals of the fourth semiconductor switching element are electrically isolated inside the second semiconductor device,
the second semiconductor switching element and the fourth semiconductor switching element are connected in series to the second direct current voltage supply,
the first semiconductor switching element and the second semiconductor switching element have a forward breakdown voltage higher than the voltage across the direct current voltage supply series circuit,
the forward breakdown voltage of the third semiconductor switching element is higher than the voltage of the first direct current voltage supply and lower than the forward breakdown voltage of the first semiconductor switching element, and
the forward breakdown voltage of the fourth semiconductor switching element is higher than the voltage of the second direct current voltage supply and lower than the forward breakdown voltage of the second semiconductor switching element.

11. The power converter according to claim 1, wherein the terminals of the first semiconductor switching element and the terminals of the third semiconductor switching element are electrically isolated inside the first semiconductor device,
the second semiconductor switching element and the fourth semiconductor switching element are connected in series inside the first semiconductor device,
the second semiconductor switching element and the fourth semiconductor switching element are connected in series to the second direct current voltage supply,
the first semiconductor switching element and the second semiconductor switching element have a forward breakdown voltage higher than the voltage across the direct current voltage supply series circuit, the forward breakdown voltage of the third semiconductor switching element is higher than the voltage of the first direct current voltage supply and lower than the forward breakdown voltage of the first semiconductor switching element, and the forward breakdown voltage of the fourth semiconductor switching element is higher than the voltage of the second direct current voltage supply and lower than the forward breakdown voltage of the second semiconductor switching element.

12. The power converter according to claim 1, wherein the terminals of the first semiconductor switching element and the terminals of the third semiconductor switching element are electrically isolated inside the first semiconductor device, the terminals of the second semiconductor switching element and the terminals of the fourth semiconductor switching element are electrically isolated inside the second semiconductor device, the first semiconductor switching element and the fourth semiconductor switching element are connected in series to the first direct current voltage supply, the second semiconductor switching element and the third semiconductor switching element are connected in series to the second direct current voltage supply, the first semiconductor switching element and the second semiconductor switching element have a forward breakdown voltage higher than the voltage across the direct current voltage supply series circuit, the forward breakdown voltage of the third semiconductor switching element is higher than the voltage of the second direct current voltage supply and lower than the forward breakdown voltage of the first semiconductor switching element, and the forward breakdown voltage of the fourth semiconductor switching element is higher than the voltage of the first direct current voltage supply and lower than the forward breakdown voltage of the second semiconductor switching element.

13. The power converter according to claim 1, wherein the first semiconductor switching element and the third semiconductor switching element are connected in anti-series inside the first semiconductor device, the terminals of the second semiconductor switching element and the terminals of the fourth semiconductor switching element are electrically isolated inside the second semiconductor device, the first semiconductor switching element and the fourth semiconductor switching element are connected in series to the first direct current voltage supply, the second semiconductor switching element and the third semiconductor switching element are connected in series to the second direct current voltage supply, the first semiconductor switching element and the second semiconductor switching element have a forward breakdown voltage higher than the voltage across the direct current voltage supply series circuit, the forward breakdown voltage of the third semiconductor switching element is higher than the voltage of the second direct current voltage supply and lower than the forward breakdown voltage of the first semiconductor switching element, and the forward breakdown voltage of the fourth semiconductor switching element is higher than the voltage of the first direct current voltage supply and lower than the forward breakdown voltage of the second semiconductor switching element.

14. The power converter according to claim 1, wherein the terminals of the first semiconductor switching element and the terminals of the third semiconductor switching element are electrically isolated inside the first semiconductor device, the second semiconductor switching element and the fourth semiconductor switching element are connected in anti-series inside the first semiconductor device, the first semiconductor switching element and the fourth semiconductor switching element are connected in series to the first direct current voltage supply, the second semiconductor switching element and the third semiconductor switching element are connected in series to the second direct current voltage supply, the first semiconductor switching element and the second semiconductor switching element have a forward breakdown voltage higher than the voltage across the direct current voltage supply series circuit, the forward breakdown voltage of the third semiconductor switching element is higher than the voltage of the second direct current voltage supply and lower than the forward breakdown voltage of the first semiconductor switching element, and the forward breakdown voltage of the fourth semiconductor switching element is higher than the voltage of the first direct current voltage supply and lower than the forward breakdown voltage of the second semiconductor switching element.

* * * * *